United States Patent
Choi et al.

(10) Patent No.: US 11,661,008 B2
(45) Date of Patent: May 30, 2023

(54) DEVICE FOR DISPLAYING LATERAL REAR IMAGES OF VEHICLE AND METHOD THEREFOR

(71) Applicant: UNITEL ELECTRONICS CO., LTD., Seoul (KR)

(72) Inventors: Jae Hyun Choi, Seoul (KR); Jung Won Kim, Gimpo-si (KR); Yu Sung Moon, Incheon (KR)

(73) Assignee: UNITEL ELECTRONICS CO., LTD., Seoul (KR)

(*) Notice: Subject to any disclaimer, the term of this patent is extended or adjusted under 35 U.S.C. 154(b) by 171 days.

(21) Appl. No.: 17/435,030

(22) PCT Filed: Jan. 14, 2020

(86) PCT No.: PCT/KR2020/000645
§ 371 (c)(1),
(2) Date: Aug. 30, 2021

(87) PCT Pub. No.: WO2020/218712
PCT Pub. Date: Oct. 29, 2020

(65) Prior Publication Data
US 2022/0161726 A1    May 26, 2022

(30) Foreign Application Priority Data
Apr. 25, 2019    (KR) .......................... 10-2019-0048651

(51) Int. Cl.
*B60R 1/12*    (2006.01)
*G06V 20/59*    (2022.01)
(Continued)

(52) U.S. Cl.
CPC .................. *B60R 1/12* (2013.01); *B60R 1/04* (2013.01); *B60R 1/074* (2013.01); *B60R 11/04* (2013.01);
(Continued)

(58) Field of Classification Search
CPC combination set(s) only.
See application file for complete search history.

(56) References Cited

U.S. PATENT DOCUMENTS

| 9,983,407 B2 * | 5/2018 | Ng-Thow-Hing | ........................... |
| | | | G02B 27/0101 |
| 2008/0077882 A1 * | 3/2008 | Kramer | .................. B60K 37/06 |
| | | | 715/810 |

(Continued)

FOREIGN PATENT DOCUMENTS

| CN | 204537057 U | 8/2015 |
| JP | 2016-199266 A | 12/2016 |

(Continued)

OTHER PUBLICATIONS

International Search Report for PCT/KR2020/000645 dated Apr. 29, 2020 from Korean Intellectual Property Office.

*Primary Examiner* — Tuyen K Vo
(74) *Attorney, Agent, or Firm* — Revolution IP, PLLC

(57) ABSTRACT

A device for displaying lateral rear images of a vehicle using a room mirror for a vehicle, includes: a smart room mirror 10 equipped with a camera sensor 11 for recognizing a driver's gesture and a motion sensor 12 for recognizing a driver's 3D gesture; camera modules 310, 410 for capturing vehicle lateral rear images, installed in left and right side-view mirrors 30, 40 of a vehicle 20; and a central processing device 60 for controlling to store, compare and analyze image information from the camera modules 310, 410 installed in the left and right side-view mirrors 30, 40, respectively, and image information from the camera sensor 11 and the motion sensor 12 of the smart room mirror 10, the central processing device 60 controlling to access a black box 50 and a communication module 51 and receive images stored in the black box 50.

5 Claims, 5 Drawing Sheets

(51) Int. Cl.
  *G06V 40/20* (2022.01)
  *G06V 40/10* (2022.01)
  *B60R 1/02* (2006.01)
  *B60R 1/04* (2006.01)
  *B60R 1/074* (2006.01)
  *B60R 11/04* (2006.01)
  *B60R 11/00* (2006.01)

(52) U.S. Cl.
  CPC .............. *G06V 20/59* (2022.01); *G06V 40/10* (2022.01); *G06V 40/28* (2022.01); *B60R 2001/1215* (2013.01); *B60R 2001/1253* (2013.01); *B60R 2011/004* (2013.01); *B60R 2011/0033* (2013.01)

(56) References Cited

U.S. PATENT DOCUMENTS

| | | |
|---|---|---|
| 2011/0260965 A1 | 10/2011 | Kim et al. |
| 2014/0005857 A1* | 1/2014 | Heisterkamp ......... B60W 50/08 |
| | | 701/1 |
| 2014/0277936 A1* | 9/2014 | El Dokor ................ B60R 1/072 |
| | | 701/1 |
| 2015/0019083 A1* | 1/2015 | Kalliomaki .......... H03K 17/955 |
| | | 701/49 |
| 2015/0022664 A1* | 1/2015 | Pflug .................... G06F 3/04883 |
| | | 348/148 |
| 2015/0116200 A1* | 4/2015 | Kurosawa ............... G06F 3/017 |
| | | 345/156 |
| 2017/0060234 A1 | 3/2017 | Sung |
| 2018/0174457 A1* | 6/2018 | Taylor .................. G08G 1/0962 |
| 2019/0031105 A1* | 1/2019 | Kim ....................... B60R 1/088 |

FOREIGN PATENT DOCUMENTS

| | | |
|---|---|---|
| KR | 10-2005-0098210 A | 10/2005 |
| KR | 10-2011-0117966 A | 10/2011 |
| KR | 10-2013-0058991 A | 6/2013 |
| KR | 10-1400419 B1 | 5/2014 |
| KR | 10-2017-0024904 A | 3/2017 |
| KR | 10-2019-0012052 A | 2/2019 |

* cited by examiner

[Fig. 1]
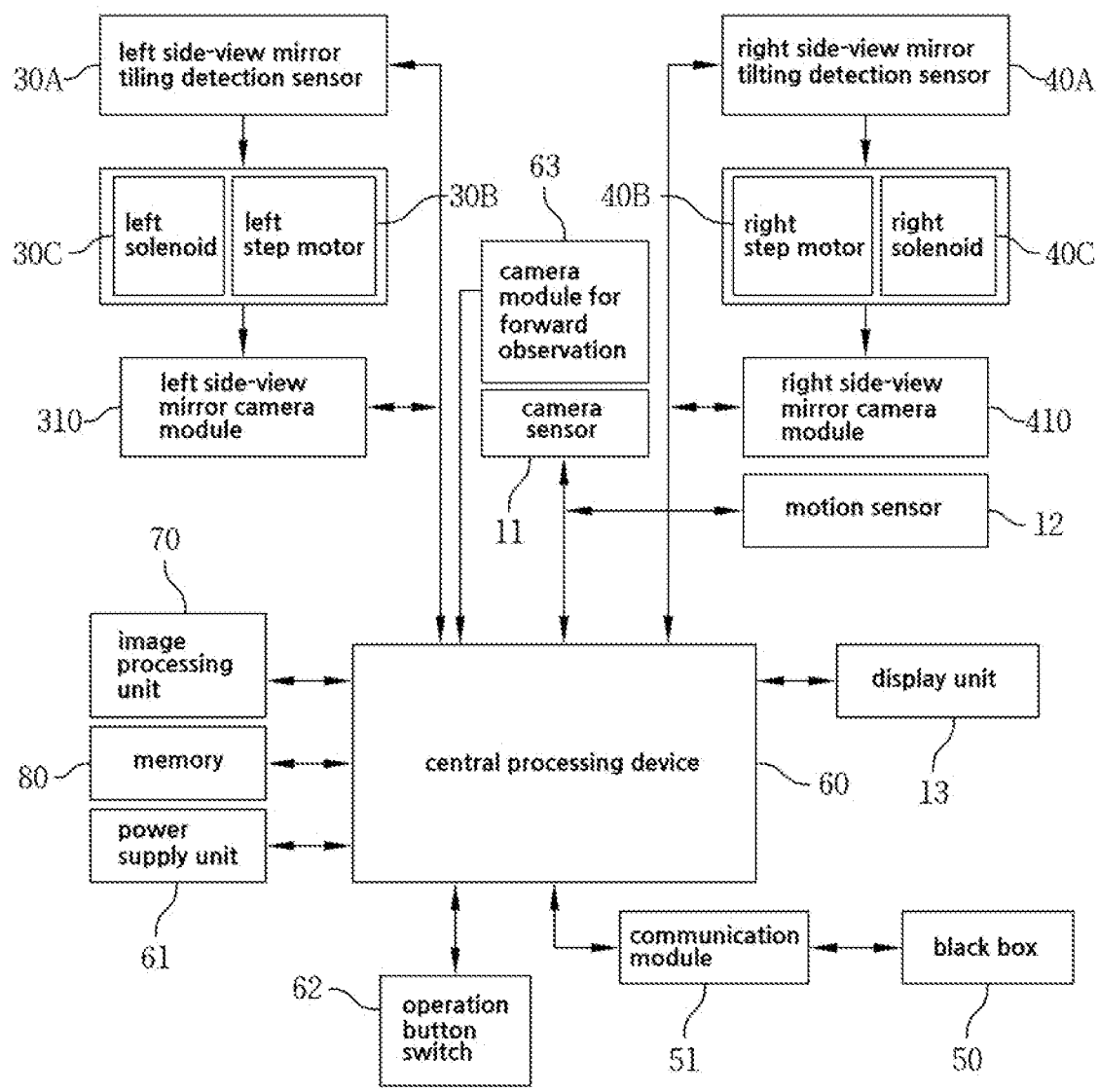

[Fig. 2]
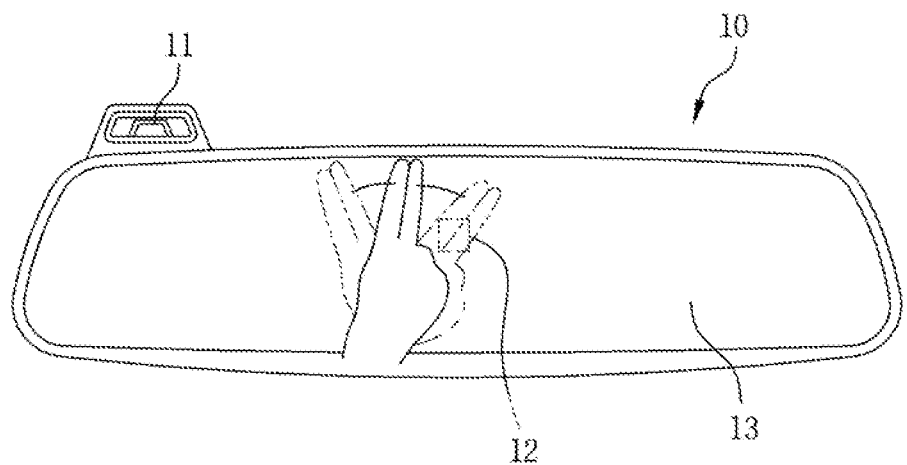
[Fig. 3]
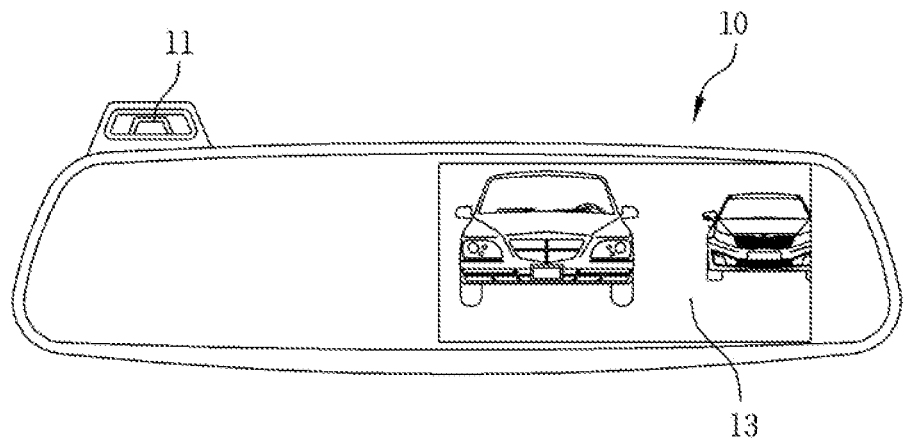

[Fig. 4]
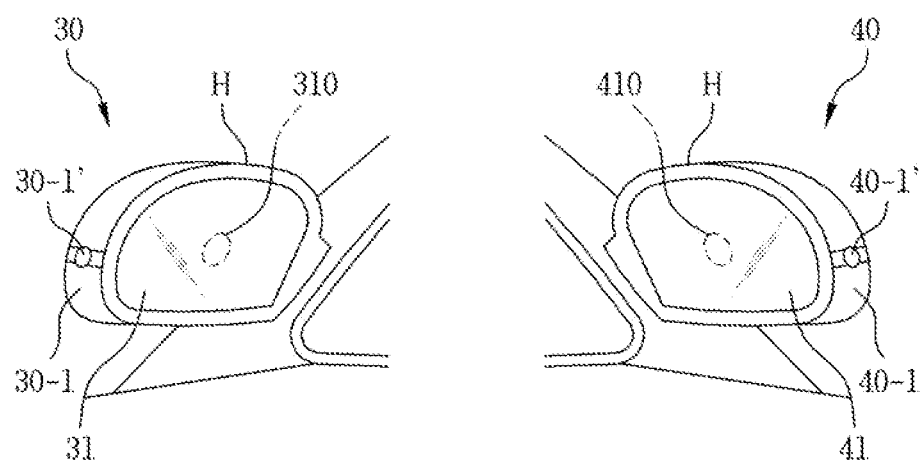
[Fig. 5]
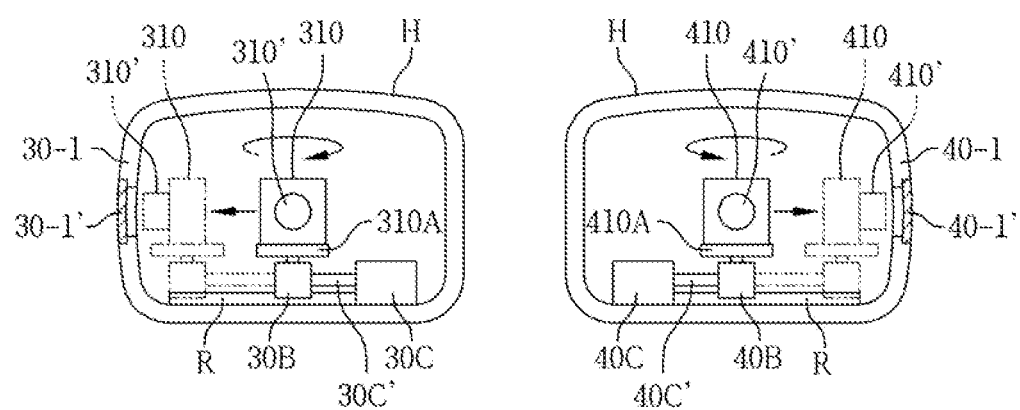

[Fig. 6]
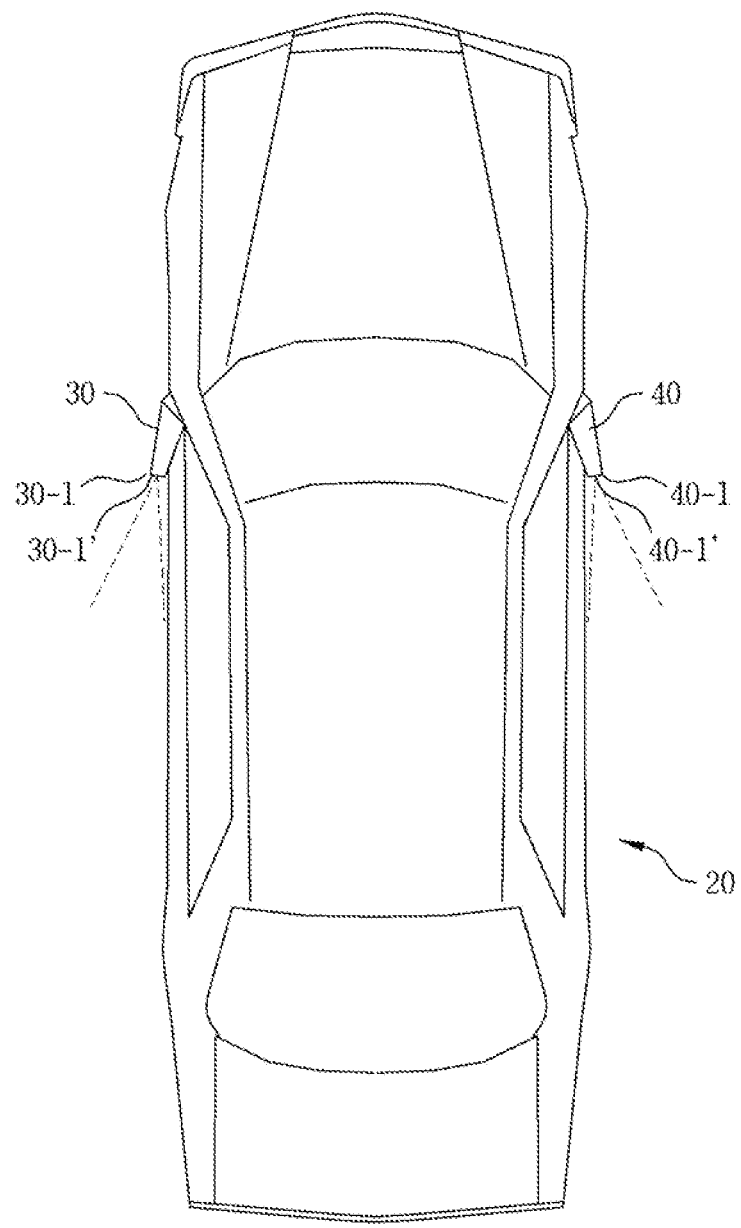

[Fig. 7]
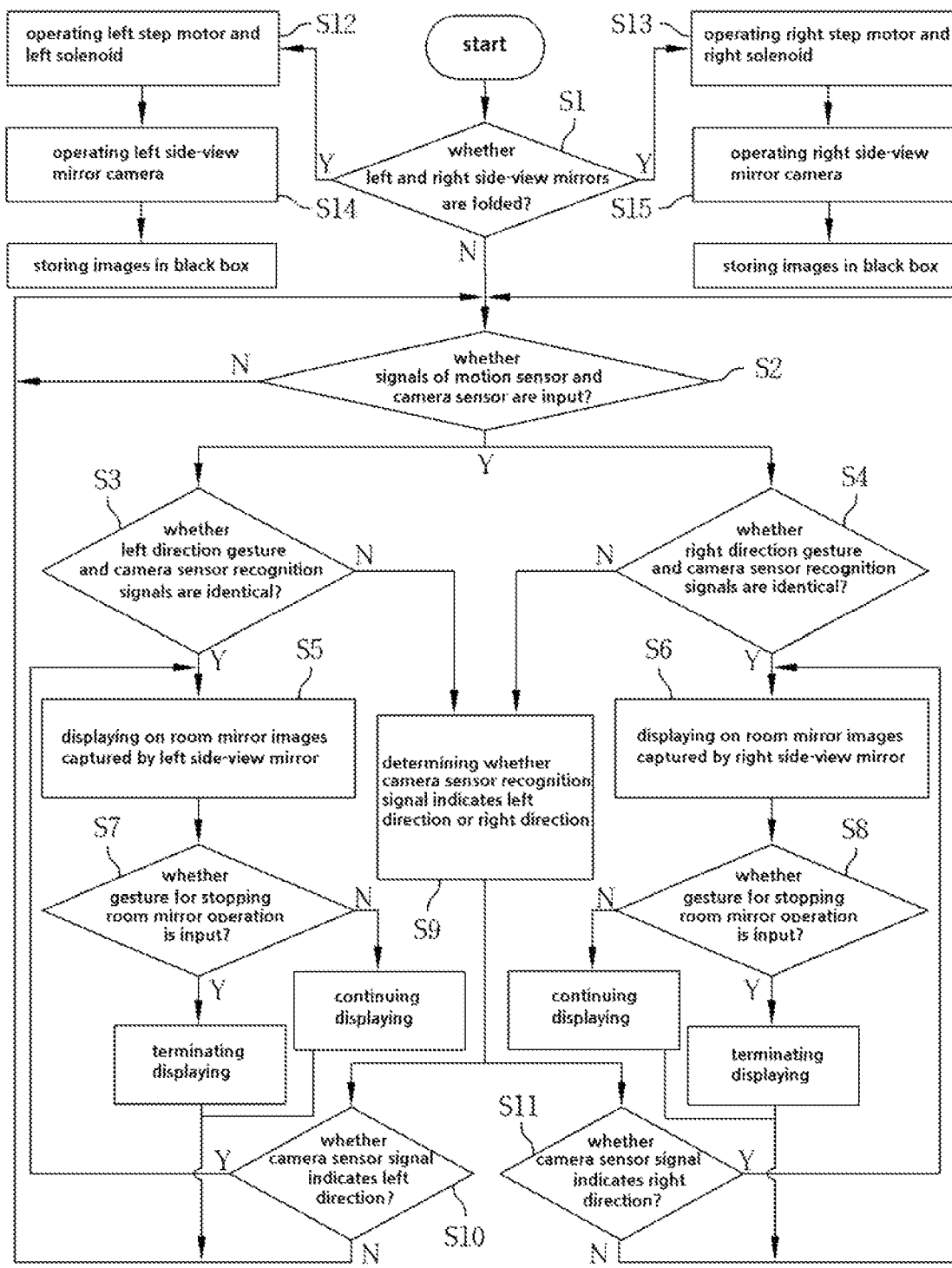

DEVICE FOR DISPLAYING LATERAL REAR IMAGES OF VEHICLE AND METHOD THEREFOR

CROSS REFERENCE TO PRIOR APPLICATIONS

This application is the 35 U.S.C. 371 national stage of International application PCT/KR2020/000645 filed on Jan. 14, 2020, which claims priority to Korean Patent Application No. 10-2019-0048651 filed on Apr. 25, 2019. The entire contents of each of the above-identified applications are hereby incorporated by reference.

TECHNICAL FIELD

The present invention relates to a device for displaying lateral rear images of a vehicle using 3D gestures and camera-based recognition and a method therefor. More specifically, the present invention relates to a device for displaying lateral rear images of a vehicle allowing a driver to conveniently observe image information of movement of objects or vehicles in the lateral rear areas of the left and right sides of the vehicle without having to turn his eyes away to the left and right directions during driving by displaying through a display unit of a smart room mirror images of cameras equipped in left and right side-view mirrors of the vehicle using a driver's 3D gesture and a camera sensor, and a method therefor.

BACKGROUND ART

In general, as a means for safe driving, a vehicle is equipped with side-view mirrors mounted on side doors to show areas behind and to the sides and a room mirror mounted on the internal roof lining to show areas behind the vehicle.

95% of traffic information during driving of a vehicle, as it is known, is collected from the driver's view. In case the driver keeps his eyes forward negligently due to an action such as operating a navigation device, etc., he can see neither the road nor the dashboard and side-view mirrors, causing him to be in great danger. Also, in case the driver takes his eyes off the road to the interior of the vehicle or in the left and right directions for several seconds, he can hardly cope with unexpected incidents occurring in front, and also the risk of safety accidents of the vehicle caused by the driver's negligence in keeping his eyes forward during high speed driving may further increase. Thus, there is a need for a system allowing a driver to intuitionally operate additional equipment of a vehicle during driving of the vehicle, while fixing his eyes forward without having to turn his eyes away to operate the additional equipment of the vehicle.

In consideration of the above, Korean Patent Laid-open Nos. 10-2005-0098210 and 10-2019-0012052 disclose that images captured by cameras mounted on side-view mirrors are displayed through a smart room mirror for a vehicle to check the conditions of the left and right sides of the vehicle.

Particularly, Korean Patent No. 10-1400419 discloses a device for displaying images using a room mirror of a vehicle, wherein a smart mirror comprises a display and mirror unit having a displaying function of displaying image information, a Hi-pass transmitting and receiving unit for transmitting and receiving Hi-pass information, a camera unit for capturing the front and rear of the vehicle, a central control unit for controlling the units, etc., thereby equipping the room mirror installed inside the vehicle with a Hi-pass terminal function and a black box function, providing images of an operation menu to a user, and implementing the room mirror to input operation information by a user's touch to check through a display unit of the room mirror images captured in real time by a front or rear camera by control of a button switch or a touch key switch, thereby attempting to prevent safety accidents caused by driver's negligence in keeping his eyes forward during driving of the vehicle.

However, in order to confirm the lateral rear conditions in the left or right direction through a room mirror while keeping the driver's eyes forward during driving of a vehicle, the driver has to move his body toward the room mirror to perform an operation such as pressing the button switch or touch key switch installed on the room mirror or inside the vehicle, etc., which makes him turn his eyes away from the road. As such, it is the same as taking the driver's eyes off the road in operating additional equipment of the vehicle during driving of the vehicle, and the driver keeps his eyes forward negligently when operating the switch. Accordingly, the driver fails to immediately cope with collision accidents, etc., occurring in front, and safety accidents cannot be prevented in advance.

DETAILED DESCRIPTION OF INVENTION

Technical Task

It is an object of the present invention to display, through a display unit of a room mirror, lateral rear images of a vehicle captured by cameras mounted in side-view mirrors by a driver's gesture and recognition of a camera sensor, without turning driver's eyes away to left and right directions during driving of the vehicle.

Also, it is another object of the present invention to automatically capture images in lateral directions of a vehicle during parking of the vehicle to monitor situations.

Method for Solving the Technical Task

The device for displaying lateral rear images of a vehicle using a room mirror for a vehicle according to the present invention comprises a smart room mirror 10 equipped with a camera sensor 11 for recognizing a driver's gesture and a motion sensor 12 for recognizing a driver's 3D gesture; camera modules 310, 410 for capturing vehicle lateral rear images, installed in left and right side-view mirrors 30, 40 of a vehicle 20; and a central processing device 60 for controlling to store, compare and analyze image information from the camera modules 310, 410 installed in the left and right side-view mirrors 30, 40, respectively, and image information from the camera sensor 11 and the motion sensor 12 of the smart room mirror 10, the central processing device 60 controlling to access a black box 50 and a communication module 51 and receive images stored in the black box 50, wherein when driver's 3D gestures of the image information from the camera sensor 11 and the motion sensor 12 of the smart room mirror 10 are identical, corresponding image information obtained from the camera module 310, 410 of the left or right side-view mirror 30, 40 is displayed through a display unit 13 of the smart room mirror 10, and when driver's 3D gestures of the image information from the camera sensor 11 and the motion sensor 12 of the smart room mirror 10 are not identical, corresponding image information on a basis of recognition information from the camera sensor 11 of the smart room mirror 10 is displayed through the display unit 13 of the smart room mirror 10.

The present invention may constitute that images captured by the camera modules 310, 410 for monitoring vehicle lateral directions when parking the vehicle 20 are stored in the block box.

In the present invention, preferably, the left and right side-view mirrors 30, 40 comprise left and right side-view mirror tilting detection sensors 30A, 40A for detecting that the left and right side-view mirrors 30, 40 are automatically folded when parking the vehicle; step motors 30B, 40B for rotating lens units 310', 410' of the camera modules 310, 410 for capturing left and right side images installed in the left and right side-view mirrors 30, 40, respectively, in directions of one ends 30-1, 40-1 of the left and right side-view mirrors 30, 40, respectively, when the left and right side-view mirror tilting detection sensors 30A, 40A detect that the left and right side-view mirrors 30, 40 are automatically folded; and solenoids 30C, 40C for moving the step motors 30B, 40B in one lateral direction.

A method for displaying lateral rear images of a vehicle using a room mirror for a vehicle comprises a first step S1 of determining whether a vehicle 20 is driving or parked; a second step S2 of, when it is determined in the first step S1 that the vehicle is driving if the left and right side-view mirrors 30, 40 of the vehicle 20 are not folded, determining whether 3D gesture image signals are input by a motion sensor 12 and a camera sensor 11; a third step S3 of determining whether a left direction gesture and a camera sensor recognition signal by the motion sensor 12 and the camera sensor 11 are identical to each other; a fourth step S4 of determining whether a right direction gesture and a camera sensor recognition signal by the motion sensor 12 and the camera sensor 11 are identical to each other; a fifth step S5 and a sixth step S6 of, when the signals recognized in each of the third step S3 and the fourth step S4 are identical, displaying lateral rear images of the left or right side-view mirror 30, 40 through a display unit 13 of a smart room mirror 10; a seventh step S7 and an eighth step S8 of determining whether a gesture for stopping the displaying on the smart room mirror 10 performed in the fifth step S5 and the sixth step S6 is input; a ninth step S9 of, when a stopping gesture is input in the seventh step S7 and the eighth step S8, stopping the displaying, or when no stopping gesture is made, continuing to display the corresponding images, and when the signals recognized in each of the third step S3 and the fourth step S4 are not identical, determining whether the camera sensor 11 indicates a left direction gesture or a right direction gesture; a tenth step S10 of determining whether the camera sensor 11 recognizes as the left direction in the ninth step S9 and an eleventh step S11 of determining whether it recognizes as the right direction; and a step of, when the camera sensor recognizes as the left and right directions in the tenth step S10 and the eleventh step S11, displaying lateral rear images of the left and right directions of the vehicle 20 through the fifth step S5 and the sixth step S6, wherein left and right side images of the vehicle are displayed using the 3D gesture and the camera sensor during driving of the vehicle.

In the present invention, the method may further comprise a twelfth step S12 and a thirteenth step S13 of, when in the first step S1 of determining whether the vehicle is driving or parked, it is determined that the vehicle is parked, operating step motors 30B, 40B and solenoids 30C, 40C of the left and right side-view mirrors 30, 40; a fourteenth step S14 and a fifteenth step S15 of capturing images using camera modules 310, 410 for capturing left and right side images in the twelfth step S12 and the thirteenth step S13, and a step of storing the images obtained from the fourteenth step S14 and the fifteenth step S b in a black box 50.

Effect of the Invention

The present invention recognizes driver's gesture motions by a motion sensor and a camera sensor equipped in a smart room mirror and performs comparative analysis by a central processing device, allowing a driver to see through the room mirror images captured by a side-view mirror of a direction the driver wants, thereby having the effects of preventing collision accidents, etc. that may occur in front of the vehicle during driving and also quickly confirming driving situations in the lateral rear of the vehicle, resulting in safe driving.

Also, the present invention can check lateral rear images of a vehicle while keeping driver's eyes forward without turning the eyes away to another direction inside the vehicle or the left and right directions.

Particularly, the present invention displays image information from side-view mirrors by operation of a driver's 3D gesture or obtains image information of a side-view mirror of a direction which the driver wants by the 3D gesture and camera sensor recognition, thereby having the effect of achieving convenience and quickness in operation controlling and accuracy through avoidance of malfunction to perform safe driving.

Also, the present invention stores, in a black box, images of situations in lateral directions of a vehicle during parking to monitor damages of not only the front of the vehicle but also the side surfaces which may occur during parking, theft, etc., thereby having the effect of greatly assisting safe parking.

BRIEF DESCRIPTION OF DRAWINGS

FIG. 1 is a circuit block diagram of a device for displaying lateral rear images of a vehicle using a room mirror for a vehicle according to the present invention;

FIG. 2 is a view illustrating an example of the constitution of a smart room mirror of the device for displaying lateral rear images of a vehicle using a room mirror for a vehicle according to the present invention and a driver's gesture motion in the smart room mirror;

FIG. 3 is a view illustrating an example of a state in which lateral rear images of a side-view mirror is displayed on the smart room mirror of the device for displaying lateral rear images of a vehicle using a room mirror for a vehicle according to the present invention;

FIG. 4 is a view illustrating an example of the constitution of left and right side-view mirrors of the device for displaying lateral rear images of a vehicle using a room mirror for a vehicle according to the present invention;

FIG. 5 is a view illustrating an example of left and right side-view mirrors of the device for displaying lateral rear images of a vehicle using a room mirror for a vehicle according to the present invention, which illustrates a state in which the side-view mirrors are automatically folded;

FIG. 6 is a plan view illustrating the operation of camera modules equipped in the side-view mirrors in a state in which the left and right side-view mirrors of the device for displaying lateral rear images of a vehicle using a room mirror for a vehicle according to the present invention are automatically folded; and FIG. 7 is a flow chart for explaining a method for displaying lateral rear images of a vehicle using a room mirror for a vehicle according to the present invention.

Hereinafter, the present invention will be explained in detail with reference to the accompanying drawings.

BEST MODE FOR CARRYING OUT THE INVENTION

FIG. 1 is a circuit block diagram of a device for displaying lateral rear images of a vehicle using a room mirror for a vehicle according to the present invention. The device for displaying images according to the present invention comprises a smart room mirror 10 equipped with a camera sensor 11 for capturing driver's fingers and a motion sensor 12 for recognizing a 3D gesture by movement of driver's fingers; camera modules 310, 410 for capturing vehicle lateral rear images, installed inside left and right side-view mirrors 30, 40 with no mirrors of a vehicle 20, respectively; and a central processing device 60 for controlling to store, compare and analyze image information from the camera modules 310, 410 installed in the left and right sides, respectively, of the left and right side-view mirrors 30, 40 of the vehicle 20 and image information from the camera sensor 11 and the motion sensor 12 of the smart room mirror 10, the central processing device 60 controlling to access a black box 50 and a communication module 51 and receive images stored in the black box 50.

The central processing device 60 controls to display image information provided from the camera modules 310, 410 for capturing left and right side images through a display unit 13 of the smart room mirror 10. An image processing unit 70 stores in real time image information provided from the camera modules 310, 410 for capturing left and right side images. A memory 80 is a database in which, for example, finger gestures of a driver that are necessary for the present invention are classified and stored. The central processing device 60 compares and analyzes image information from the camera sensor 11 and the motion sensor 12 and data stored in the memory. The display unit 13 of the smart room mirror 10 can display image information by dividing the information into one part or two equal parts or more. The smart room mirror 10, which is a device based on a mirror-type display that normally reflects light like a mirror but supports the provision of various information as a display device depending on circumstances, can perform a mirror function and a displaying function at the same time by applying a technique of manufacturing a display such as LCD to glass or film having mirror properties on a display surface.

The left and right side-view mirrors 30, 40 of the present invention have camera modules 310, 410 for capturing left and right side images embedded in transparent windows 31, 41, as shown in FIG. 4, to provide lateral rear images of the left and right sides of a vehicle during driving. FIG. 4 illustrates that the left and right side-view mirrors 30, 40 are in a shape of a conventional side-view mirror, but the present invention is not limited to this shape and may be implemented into various shapes equipped with the camera modules 310, 410 alone without mirror or the transparent windows 31, 41.

The central processing device 60 is operated by power supply of a power supply unit 61, may have an operation button switch 62 installed for a situation in which gesture motions are not necessary, etc., and may store, in the black box 50 through the communication module 51, image information of the front of a vehicle from a camera module 63 for forward observation installed in any position inside or outside the vehicle. When driver's 3D gestures of image information from the camera sensor 11 of the smart room mirror 10 and image information from the motion sensor 12 are identical to each other, the central processing device 60 controls to display corresponding image information obtained from the camera module 310, 410 of the left or right side-view mirror 30, 40 through the display unit 13 of the smart room mirror 10. When driver's 3D gestures of image information from the camera sensor 11 and the motion sensor 12 of the smart room mirror 10 are not identical to each other, the central processing device 60 controls to display corresponding image information on a basis of recognition information from the camera sensor 11 of the smart room mirror 10 through the display unit 13 of the smart room mirror 10. The motion sensor 12 for recognizing 3D gestures can recognize gestures by recognizing a moving path of motion point values detected by a hand image detection unit in the motion sensor. Gestures can be recognized by tracking a change in motion point values occurring when waving fingers left or right while putting index finger and middle finger together or bending the fingers in any one direction, as shown in FIG. 2, or sticking out index finger or bending the finger in any one direction.

According to the present invention, not only a driver's 3D gesture recognized by the motion sensor 12 but also a driver's gesture motion captured by the camera sensor 11 is recognized for comparative analysis. When the 3D gesture and the images from the camera sensor 11 are identical to each other, corresponding images from the side-view mirror 30, 40 are displayed on the display unit 13, thereby enabling a driver to obtain the images from the side-view mirror 30, 40 of the correct direction which the driver wants. In case only a driver's 3D gesture is used, when an error or a malfunction occurs in the image processing device due to misrecognition of the 3D gesture or provision of an incorrect gesture, there is a risk that a safety accident caused by misunderstanding of a circumstance of the left or right side of the vehicle 20 may occur during driving. Thus, the present invention uses an algorism through comparative analysis between the motion sensor 12 and the camera sensor 11 to prevent a malfunction. Here, the shape of fingers or gestures may be implemented into various ways, and hereinafter, an example is explained with reference to FIG. 2.

As illustrated in FIG. 2, when a driver puts index finger and middle finger together and waves the fingers in the right direction and the motion sensor 12 recognizes the driver's 3D gesture, the camera sensor 11 operates simultaneously. In this state, the images of fingers recognized by the camera sensor 11 and the images recognized by the motion sensor 12 are compared and analyzed, and the lateral rear images of the right side from the camera module 410 of the side-view mirror 40 in the right direction are displayed on the display unit 13 of the smart room mirror 10, as illustrated in FIG. 3. Likewise, when a driver puts index finger and middle finger together and waves the fingers in the left direction, the lateral rear images of the left side are displayed on the display unit 13 of the smart room mirror 10. As such, a driver can correctly view the circumstances in the rear of the left or right side of the vehicle 20 while keeping his eyes forward, without turning his eyes away to another direction inside the vehicle 20, and thus, safer driving can be facilitated.

If a driver makes a 3D gesture to see the right direction of the vehicle during driving but the motion sensor 12 does not recognize the gesture or the 3D gesture is not identical to images from the camera sensor 11, images in a direction recognized based on the images from the camera sensor 11 are obtained. Thereby, the risk caused by incorrect motion of the 3D gesture may be avoided.

As illustrated in FIG. 5, the left and right side-view mirrors 30, 40 of the present invention may comprise left and right side-view mirror tilting detection sensors 30A, 40A for detecting that the left and right side-view mirrors 30, 40 are folded when parking a vehicle, step motors 30B, 40B for rotating lens units 310', 410' of camera modules 310, 410 for capturing left and right side images installed in the left and right side-view mirrors 30, 40, respectively, in directions of one ends 30-1, 40-1 of the left and right side-view mirrors 30, 40, respectively, as illustrated in FIG. 4 and FIG. 5, when the left and right side-view mirror tilting detection sensors 30A, 40A detect that the left and right side-view mirrors 30, 40 are automatically folded, solenoids 30C, 40C for moving the step motors 30B, 40B in one lateral direction, and pistons 30C', 40C' connected to the solenoids. Rotating disks 310A, 410A fixedly installed on the bottom of the camera modules 310, 410 for capturing left and right side images are connected with shafts of the step motors 30B, 40B and installed to be rotatable at a certain angle by operation of the step motors 30B, 40B. One end of the pistons 30C', 40C' of the solenoids 30C, 40C may be fixedly installed on one side of the step motors 30B, 40B. Guiding rails R for moving the step motors 30B, 40B are installed in the lower end of housings H of the left and right side-view mirrors 30, 40, respectively, for free movement of the step motors 30B, 40B. Accordingly, the camera modules of the side-view mirrors can by adjusted at a desired angle during parking for capturing images. Reference numerals 30-1', 40-1' in the drawings which are not explained denote transparent windows.

The left and right side-view mirrors 30, 40 with the aforementioned constitution can monitor the incidents in the side surfaces such as vehicle damages that may occur during parking, theft, etc., by which when the left and right side-view mirrors 30, 40 are automatically folded upon parking, the left and right side-view mirror tilting detection sensors 30A, 40A detect the folding, the camera modules 310, 410 for capturing left and right side images rotate and move, as illustrated in the single dot and dash line in FIG. 5, and capture images through the transparent windows 30-1', 40-1' at the one ends 30-1, 40-1 of the left and right side-view mirrors 30, 40, respectively, as illustrated in FIG. 6, and the captured images are stored in the black box 50. A method for processing images of the present invention which is operated and controlled as above is explained in detail with reference to the flow chart in FIG. 7.

Referring to FIG. 7, the present invention may comprise a first step S1 of determining whether a vehicle is driving or parked by determining whether left and right side-view mirrors 30, 40 of a vehicle 20 are folded, whether an engine is started, or the shift lever position, etc. In the first step S1, it is determined whether the vehicle 20 is driving or parked, to determine whether to rotate and move camera modules 310, 410 mounted in the left and right side-view mirrors 30, 40.

The present invention may comprise a second step S2 of, when it is determined in the first step S1 that the vehicle is driving based on information that the left and right side-view mirrors 30, 40 of the vehicle 20 are not folded, etc., determining whether a 3D gesture image signal is input by a motion sensor 12 and a camera sensor 11. In the step S2, when a driver's 3D gesture is input by the motion sensor 12, the camera sensor 11 is operated, or when a driver's 3D gesture is input by both the motion sensor 12 and the camera sensor 11, it is recognized as an input signal of the present invention for which images are displayed.

In a third step S3, it is determined whether a left direction gesture and a camera sensor recognition signal by the motion sensor 12 and the camera sensor 11 are identical to each other. In a fourth step S4, it is determined whether a right direction gesture and a camera sensor recognition signal by the motion sensor 12 and the camera sensor 11 are identical to each other. The third step S3 and the fourth step S4 are for correctly recognizing the driver's 3D gesture for processing.

When the signals recognized in each of the third step S3 and the fourth step S4 are identical, the present invention may comprise a fifth step S5 and a sixth step S6 of displaying lateral rear images of the left or right side-view mirror 30, 40 through a display unit 13 of a smart room mirror 10, thereby allowing a driver to quickly and conveniently view the lateral rear of the left and right directions of the vehicle while keeping his eyes forward without turning the eyes away to the left or right direction the driver wants to see.

The present invention further performs a seventh step S7 and an eighth step S8 of determining whether a 3D gesture for stopping the displaying on the smart room mirror 10 performed in the fifth step S5 and the sixth step S6 is input; and performs the step S2 when a stop gesture is input in the seventh step S7 and the eighth step S8 and the displaying is terminated, and continues to perform the step S2 while continuing to display the corresponding images when no gesture is input.

When the signals recognized in each of the third step S3 and the fourth step S4 are not identical, the present invention may comprise a ninth step S9 of determining whether the camera sensor 11 indicates a left direction gesture or a right direction gesture; a tenth step S10 of determining whether the camera sensor 11 recognizes as the left direction in the ninth step S9; and an eleventh step S11 of determining whether it recognizes as the right direction, to avoid the risk caused by an error or incorrect motion of the driver's gesture.

When the camera sensor 11 recognizes as the left and right directions in the tenth step S10 and the eleventh step S11, lateral rear images of the left and right directions of the vehicle 20 are displayed through the fifth step S5 and the sixth step S6, respectively, to display the left and right side images of the vehicle using the 3D gesture and the camera sensor during driving of the vehicle. When the camera sensor 11 does not recognize the direction, the display shows that recognition is unavailable, the process moves to the step S2 and waits for signal input again.

When in the first step S1 of determining whether the vehicle 20 is driving or parked, the vehicle 20 is recognized as being parked, the present invention may comprise a twelfth step S12 and a thirteenth step S13 of operating step motors 30B, 40B and solenoids 30C, 40C of the left and right side-view mirrors 30, 40; a fourteenth step S14 and a fifteenth step S15 of lens units 310', 410' of camera modules 310, 410 for capturing left and right side images in the twelfth step S12 and the thirteenth step S13 capturing images through transparent windows 30-1', 40-1' in one ends 30-1, 40-1 of the left and right side-view mirrors 30, 40, respectively; and a step of storing the images obtained from the fourteenth step S14 and the fifteenth step S15 in a black box 50 to record situations in the lateral rear of the vehicle 20 during parking, thereby allowing a driver to monitor damages of not only the front of the vehicle but also the side surfaces of the vehicle that may occur during parking, theft, etc., and to facilitate safer parking.

The present invention is explained in detail as above, and the explanation is provided for illustrative purposes only and is not intended to limit the scope of the present invention. Also, it should be understood that various modifications and applications which are not exemplified in the above can be made by those skilled in the art within a scope not deviating from the essential properties of the present embodiments. In addition, it should be interpreted that differences associated with such modifications and applications fall within the scope of the present invention as prescribed by the appended claims.

What is claimed is:

1. A device for displaying lateral rear images of a vehicle using a room mirror for a vehicle, comprising:
    a smart room mirror 10 equipped with a camera sensor 11 for recognizing a driver's gesture and a motion sensor 12 for recognizing a driver's 3D gesture;
    camera modules 310, 410 for capturing vehicle lateral rear images, installed in left and right side-view mirrors 30, 40 of a vehicle 20; and
    a central processing device 60 for controlling to store, compare and analyze image information from the camera modules 310, 410 installed in the left and right side-view mirrors 30, 40, respectively, and image information from the camera sensor 11 and the motion sensor 12 of the smart room mirror 10, the central processing device 60 controlling to access a black box 50 and a communication module 51 and receive images stored in the black box 50,
    wherein when driver's 3D gestures of the image information from the camera sensor 11 and the motion sensor 12 of the smart room mirror 10 are identical, corresponding image information obtained from the camera module 310, 410 of the left or right side-view mirror 30, 40 is displayed through a display unit 13 of the smart room mirror 10, and when driver's 3D gestures of the image information from the camera sensor 11 and the motion sensor 12 of the smart room mirror 10 are not identical, corresponding image information on a basis of recognition information from the camera sensor 11 of the smart room mirror 10 is displayed through the display unit 13 of the smart room mirror 10.

2. The device of claim 1, wherein ages captured by the camera modules 310, 410 for monitoring vehicle lateral directions when parking the vehicle 20 are stored in the block box.

3. The device of claim 1, wherein the left and right side-view mirrors 30, 40 comprise:
    left and right side-view mirror tilting detection sensors 30A, 40A for detecting that the left and right side-view mirrors 30, 40 are automatically folded when parking the vehicle;
    step motors 30B, 40B for rotating lens units 310', 410' of the camera modules 310, 410 for capturing left and right side images installed in the left and right side-view mirrors 30, 40, respectively, in directions of one ends 30-1, 40-1 of the left and right side-view mirrors 30, 40, respectively, when the left and right side-view mirror tilting detection sensors 30A, 40A detect that the left and right side-view mirrors 30, 40 are automatically folded; and
    solenoids 30C, 40C for moving the step motors 30B, 40B in one lateral direction.

4. A method for displaying lateral rear images of a vehicle using a room mirror for a vehicle, comprising:
    a first step S1 of determining whether a vehicle 20 is driving or parked;
    a second step S2 of, when it is determined in the first step S1 that the vehicle is driving if the left and right side-view mirrors 30, 40 of the vehicle 20 are not folded, determining whether a 3D gesture image signal is input by a motion sensor 12 and a camera sensor 11;
    a third step S3 of determining whether a left direction gesture and a camera sensor recognition signal by the motion sensor 12 and the camera sensor 11 are identical to each other;
    a fourth step S4 of determining whether a right direction gesture and a camera sensor recognition signal by the motion sensor 12 and the camera sensor 11 are identical to each other;
    a fifth step S5 and a sixth step S6 of, when the signals recognized in each of the third step S3 and the fourth step S4 are identical, displaying lateral rear images of the left or right side-view mirror 30, 40 through a display unit 13 of a smart room mirror 10;
    a seventh step S7 and an eighth step S8 of determining whether a gesture for stopping the displaying on the smart room mirror 10 performed in the fifth step S5 and the sixth step S6 is input;
    a ninth step S9 of, when a stopping gesture is input in the seventh step S7 and the eighth step S8, stopping the displaying, or when no stopping gesture is made, continuing to display the corresponding images, and when the signals recognized in each of the third step S3 and the fourth step S4 are not identical, determining whether the camera sensor 11 indicates a left direction gesture or a right direction gesture;
    a tenth step S10 of determining whether the camera sensor 11 recognizes as the left direction in the ninth step S9 and an eleventh step S11 of determining whether it recognizes as the right direction; and
    a step of, when the camera sensor recognizes as the left and right directions in the tenth step S10 and the eleventh step S11, displaying lateral rear images of the left and right directions of the vehicle 20 through the fifth step S5 and the sixth step S6,
    wherein left and right side images of the vehicle are displayed using the 3D gesture and the camera sensor during driving of the vehicle.

5. The method of claim 4, further comprising:
    a twelfth step S12 and a thirteenth step S13 of, when in the first step S1 of determining whether the vehicle is driving or parked, it is determined that the vehicle is parked; operating step motors 30B, 40B and solenoids 30C, 40C of the left and right side-view mirrors 30,
    a fourteenth step S14 and a fifteenth step S15 of capturing images using camera modules 310, 410 for capturing left and right side images in the twelfth step S12 and the thirteenth step S13; and
    a step of storing the images obtained from the fourteenth step S14 and the fifteenth step S15 in a black box 50,
    wherein situations in the lateral rear of the vehicle 20 are recorded during parking of the vehicle.

* * * * *